E. S. GILLIES.
Wheel-Cultivator.
No. 48,271. Patented June 20, 1865.
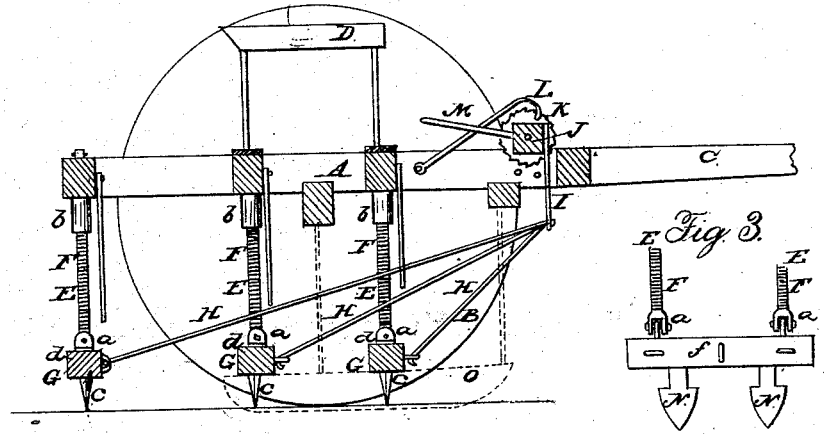
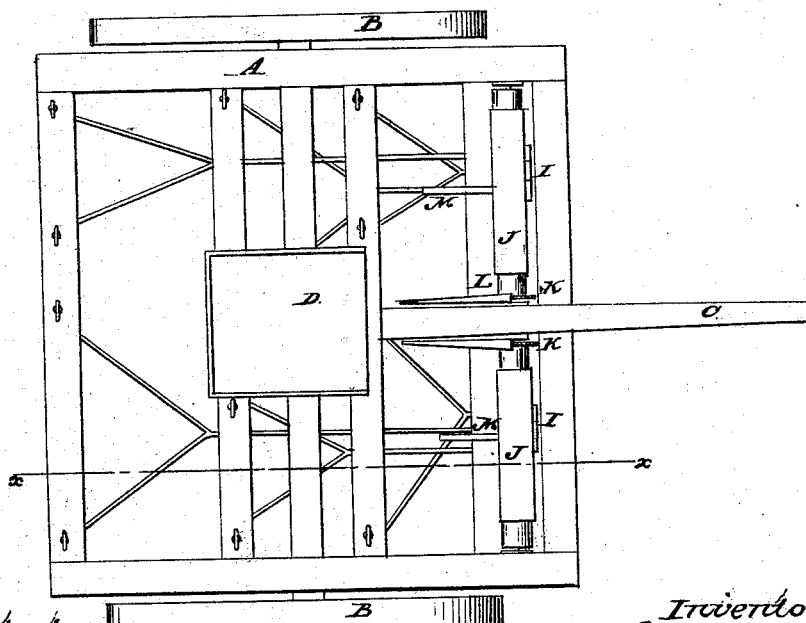

UNITED STATES PATENT OFFICE.

EDWD. S. GILLIES, OF ALBANY, WISCONSIN.

IMPROVEMENT IN CULTIVATORS.

Specification forming part of Letters Patent No. 48,271, dated June 20, 1865.

*To all whom it may concern:*

Be it known that I, EDWARD S. GILLIES, of Albany, in the county of Green and State of Wisconsin, have invented a new and Improved Cultivator; and I do hereby declare that the following is a full, clear, and exact description thereof, which will enable others skilled in the art to make and use the same, reference being had to the accompanying drawings, forming part of this specification.

This invention relates to a new and improved cultivator for general use; and it consists in a novel arrangement of harrows, plows, and guards, whereby the implement may be adapted to various kinds of works, as hereinafter set forth.

In the accompanying drawings, Figure 1 is a side sectional view of my invention, taken in the line *x x*, Fig. 2; Fig. 2, a plan or top view of the same; Fig. 3, a detached view of two plows pertaining to the invention.

Similar letters of reference indicate like parts.

A represents a rectangular frame, which is mounted on two wheels, B B, and has a draft-pole, C, attached to it, and a driver's seat, D, secured upon it at about its center.

E represents a series of pendent rods attached to frame A, there being four rods depending from three cross-bars of the frame. On each of these rods E there is placed a spiral spring, F, the lower ends of the latter bearing against eyes *a* at the lower ends of the rods, and the upper ends bearing against washers *b* on the upper parts of said rods, the washers being at the under sides of the cross-bars of the frames. The rods E are fitted loosely in the cross-bars of the frame A, and the springs F have a tendency to press said rods downward.

G represents harrows, which are composed of teeth *c*, inserted in heads *d*, the latter being attached each to two of the rods E by joints composed of eyes fitting in the eyes *a*, with pins passing through them. The front sides of these heads *d* are connected by rods H to springs I, which are attached to shafts J J on the front part of the frame A. These shafts J have each a ratchet, K, at their inner ends, with which pawls L engage, and each shaft is provided with a lever, M.

The harrow-teeth *c* are made to penetrate the earth by means of the springs F, and the harrows are allowed to yield to obstructions which may lie in their path by the yielding or giving of the springs I, said springs being sufficiently rigid or stiff to keep the harrow-teeth to their work when they do not come in contact with obstructions.

The shafts J are prevented from turning by means of the ratchet and pawls; but in case the harrow-teeth become clogged with weeds or other trash, the pawls L are raised free from the ratchets, which admit of the harrows turning back, so that they may relieve or free themselves. On dropping the pawls L the shafts are brought back to their original position by means of the levers M, the latter being actuated by the feet of the driver.

When the harrows are not required, or when plows are used, bars *f*, similar to the harrow-heads *d*, are attached to the rods E, and in precisely the same manner. These bars *f* have plows N attached to them, of any proper form, and in such a manner as to be capable of being adjusted in an oblique position to the right or left, or in a position parallel with the bars *f*. This will admit of the earth being thrown toward or from the plants.

The plows N, it will be seen, are acted upon by the springs in the same manner as the harrows, and when the plows are used for cultivating corn I attach guards O, as shown in red in Fig. 1, to prevent the plants being injured by having clods of earth thrown upon them.

This implement, it will be seen, may be used for general work, so far as the cultivating of crops is concerned, plowing, harrowing, eradicating weeds, loosening the earth, &c.

I claim as new and desire to secure by Letters Patent—

The attaching of harrows and plows, either or both, to the frame of a cultivator by means of pendent rods E, provided with springs F, and connecting the heads of the harrows and plows to springs I, attached to shafts J at the front part of frame A, in the manner substantially as and for the purpose set forth.

EDWD. S. GILLIES.

Witnesses:
E. R. ROCKWOOD,
C. S. GLEASON.